United States Patent [19]
Onishi et al.

[11] Patent Number: 5,674,614
[45] Date of Patent: Oct. 7, 1997

[54] VARNISH-COATED ELECTRIC WIRE AND METHOD OF PRODUCING THE SAME

[75] Inventors: Yasuhiko Onishi; Kazuo Iura; Atsushi Maeno; Takashi Itoh; Kazunori Tsuji, all of Yokkaichi, Japan

[73] Assignee: Sumitomo Wiring Systems, Ltd., Mie, Japan

[21] Appl. No.: 456,613

[22] Filed: Jun. 1, 1995

Related U.S. Application Data

[63] Continuation of Ser. No. 45,799, Apr. 15, 1993, abandoned.

[30] Foreign Application Priority Data

Apr. 16, 1992 [JP] Japan ................................ 4-124341
Apr. 16, 1992 [JP] Japan ................................ 4-124342

[51] Int. Cl.$^6$ ........................... B32B 15/00; B05D 5/12
[52] U.S. Cl. ..................... 428/379; 428/375; 528/342; 174/110 SR; 174/110 N; 427/118; 427/120
[58] Field of Search ........................ 428/379, 378; 528/342; 174/110 SR, 110 N; 427/120, 118

[56] References Cited

U.S. PATENT DOCUMENTS

| | | | |
|---|---|---|---|
| 2,895,948 | 7/1959 | Brinker et al. | 528/342 |
| 3,168,417 | 2/1965 | Smith et al. | 174/120 SR |
| 3,408,336 | 10/1968 | Benson | 528/342 |
| 3,503,929 | 3/1970 | Loudas | 428/379 |
| 3,708,439 | 1/1973 | Sayigh | 528/342 |
| 4,273,829 | 6/1981 | Perrcault | 428/379 |
| 4,927,909 | 5/1990 | Wadhwa et al. | 528/331 |
| 4,973,629 | 11/1990 | Williams et al. | 525/432 |
| 4,973,630 | 11/1990 | Leung et al. | 525/432 |
| 5,017,681 | 5/1991 | Wadhwa et al. | 528/342 |
| 5,137,985 | 8/1992 | Chen, Sr. et al. | 525/431 |

FOREIGN PATENT DOCUMENTS

| | | |
|---|---|---|
| 53-015088 | 5/1978 | Japan . |
| 61-40344 | 2/1986 | Japan . |
| 4-218212 | 8/1992 | Japan . |

OTHER PUBLICATIONS

E.J. Powers and G. A. Serad, "History and Development of Polybenzimidole", Apr. 15–18, 1986, pp. 1–23.

*Primary Examiner*—Jill Gray
*Attorney, Agent, or Firm*—Oliff & Berridge

[57] ABSTRACT

A varnish-coated electric wire includes cured coatings of polybenzimidazole. The polybenzimidazole coatings are cured utilizing a polymerization initiator. The varnish-coated electric wire has a high heat-resistance.

19 Claims, 1 Drawing Sheet

VARNISH-COATED ELECTRIC WIRE AND METHOD OF PRODUCING THE SAME

This is a Continuation of application Ser. No. 08/045,799 filed Apr. 15, 1993, now abandoned.

FIELD OF THE INVENTION

The present invention relates to a varnish-coated electric wire having high heat-resistance and a method of producing the same.

BACKGROUND OF THE INVENTION

There have so far been no highly heat-resistant electric wires that can be used at 350° C. at all times, and the most heat-resistant electric wires have been polyimide-coated electric wires, which have a service temperature of 250° C. On the other hand, with the trends toward size reduction and performance elevation in electrical machines and apparatus, enameled electric wires generally tend to be more frequently required to have high heat-resistance. In particular, such high heat-resistance is desired because of the trend toward size reduction in magnetic coils and the like. According to a recent study, in the fiscal year 1990, for example, enameled electric wires having a service temperature of 150° C. or higher accounted for 27.6% of all enameled electric wires produced. These heat-resistant enameled electric wires include polyester-enameled wires, polyester-polyamide wires, polyesterimide-enameled wires, polyamidoimide-enameled wires, polyimide-enameled wires, and the like. However, the service temperatures of these enameled wires are said to be between 150° C. and 230° C. Further, such conventional enameled wires have a drawback in that although they are required to have resistance to deterioration by thermal cycling, since the magnetic coils employed in electrical machines and apparatus are often used in such a manner that the load applied thereto is varied within a short time period, it is difficult in most cases to meet the requirement because of the differences in the coefficient of thermal expansion between the enamel coatings and the conductors. As an expedient for overcoming this problem, for example, coil-fixing varnishes or highly heat-resistant cementing enameled wires have been developed. However, these expedients still have various problems. For example, varnish impregnation is troublesome, and any of the cementing enameled wires has difficulties in low-temperature fusion bonding or shows poor resistance to refrigerants. Basically, these electric wires have insufficient heat resistance, the service temperatures of which are up to 230° C.

As described above, the conventional heat-resistant electric wires such as enameled wires are unable to withstand use at 250° C. or higher, that is, they have had a problem of poor heat resistance.

Polybenzimidazole was developed as a heat-resistant material by the late Prof. Marvell and co-workers in Arizona State University, U.S.A. and disclosed in H. Vogel and C. S. Marvel, *J. Polym. Sci.*, Vol. 50, P511 (1961). However, their synthesis of polybenzimidazole failed to yield a solvent-soluble polymer because of occurrence of a crosslinking reaction. Hence, it is thought that use of their polybenzimidazole as, for example, a varnish for heat-resistant electric wires is difficult.

Hoechst Celanese Corp. of America, however, has succeeded in inhibiting the crosslinking reaction of polybenzimidazole to yield a polymer which is available under trade name "CELAZOLE™". Reference can be made to E. J. Powers and G. A. Serad, "History and Development of Polybenzimidazoles" presented at the Symposium on the History of High Performance Polymers, American Chemical Society, New York, Apr. 15–18, 1986 and published in High Performance polymers. This polymer is superior to polyimides in heat-resisting properties. Specifically, the polymer has a heat-distortion temperature of 435° C., is incombustible even in air having an oxygen content of 58%, retains its physical properties in a wide temperature range of from a temperature as high as 760° C. to a temperature as low as −200° C., and has a dielectric breakdown voltage of 20.9 kv/mm. However, there have so far been no reports on the polymer's property of forming a film by the solvent-cast method, or on an experiment in which the polymer is coated on an electric wire and its properties are examined.

SUMMARY OF THE INVENTION

A first object of the present invention is to provide a varnish-coated electric wire having excellent heat resistance.

A second object of the present invention is to provide a method for producing the varnish-coated electric wire.

Paying attention to the above-mentioned unique properties of polybenzimidazole, the present inventors made an extensive study on the polymer's coating properties. As a result, it has been found that the coatings having high heat resistance can be provided on an electric wire using a varnish containing polybenzimidazole as a major resin component and a radical polymerization initiator or by coating a varnish containing polybenzimidazole as a major resin component with or without a radical polymerization initiator at a coating rate of from 0.1 m/min to 1,000 m/min. The present invention has been accomplished based on the above discovery.

The first object has been attained by an electric wire obtained by coating either a conductor or a wire comprising an insulator-covered conductor, with a varnish containing polybenzimidazole as a major resin component and curing the coatings.

The second object has been attained by a method of producing an electric wire, which comprises coating a varnish containing polybenzimidazole as a major resin component with or without a radical polymerization initiator on either a conductor or a wire comprising an insulator-covered conductor at a coating rate of from 0.1 m/min to 1,000 m/min.

DETAILED DESCRIPTION OF THE INVENTION

Figure 1:
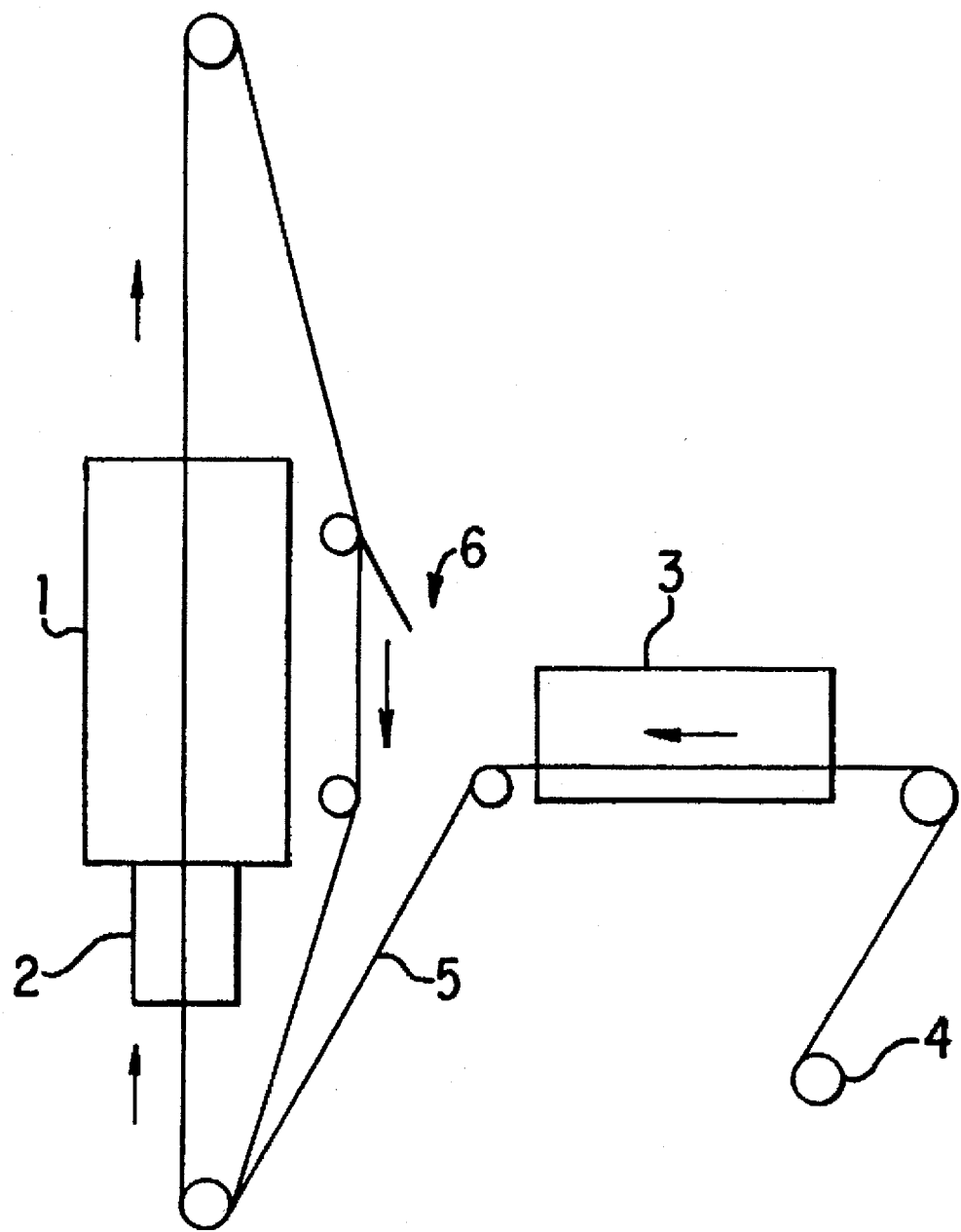
FIG. 1 is a diagrammatic view illustrating an apparatus for producing an varnish-coated electric wire according to the present invention.

A varnish which can be used in the present invention comprises a resin component containing polybenzimidazole as a major resin component and a solvent.

The polybenzimidazole (hereafter referred to as "PBI") is a polymer having, as a repeating unit, a divalent group derived from benzimidazole, preferably represented by formula (I)

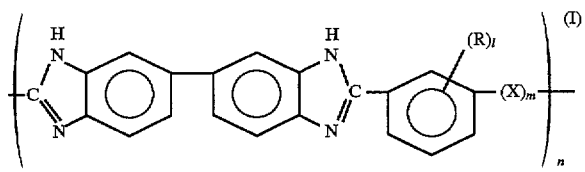

wherein X represents a sulfur atom or an oxygen atom; R represents an alkyl group, an alkoxy group, or an ester group; l is 0 or an integer of 1 to 4; m is 0 or 1; and n is an integer of 5 or more, preferably from 50 to 1,000 and more preferably from 200 to 600. Particularly preferred repeating units are those of formula (I) wherein 1 and m are 0. PBI used in the preferably from 200 to 600. Particularly preferred repeating units are those of formula (I) wherein 1 m are 0. PBI used in the present invention is preferably a linear polymer having a low or intermediate polymerization degree. PBI can be prepared by the method described in the aforesaid "History and Development of Polybenzimidazoles", and it is also available under the trade name "CELAZOLE™" which is a dimethylacetamide solution of PBI.

The resin component of the varnish may contain other resins such as polyesters, polyester-nylons, polyesterimides, polyamidoimides and polyimides, if desired. PBI is contained in an amount of at least 50% by weight, preferably 70% by weight or more, particularly preferably 90% by weight or more, based on the total weight of the resin component.

Examples of the solvent used in the varnish of the present invention include basic solvents such as dimethylacetamide (DMA), dimethylformamide (DMF), and pyridine; and hydrogen bond-cleaving solvents such as dimethylsulfoxide (DMSO). The varnish concentration, i.e., the resin concentration of the varnish, may be properly selected from a wide range of up to 80% by weight per volume (hereafter referred to as % (W/V)), preferably 5 to 40% (W/V) and particularly preferably 15 to 30% (W/V).

According to the present invention, it is important to coat the varnish on an electric wire in such a manner that PBI in the varnish is neatly stacked on the wire. This can be done by coating the varnish at a coating rate (linear speed) of 0.1 to 1000 m/min, preferably 2 to 200 m/min. Coating can be effected with a felt or dice-squeezing means. Alternatively, a radical polymerization initiator is added to the varnish so that PBI is crosslinked at a low temperature (preferably 70° C. or lower) when coated on the wire. The thus coated layer is then cured by heating or irradiating electron beams thereto.

The radical polymerization initiator which can be used in the present invention is preferably a compound capable of initiating polymerization at a relatively low temperature, e.g., 70° C. or lower, such as benzoyl peroxide, lauroyl peroxide, di-t-butyroperoxyphthalate, azobisisobutyro nitril, phenylazoallylsulfonic acid and N-nitroso-N-acyl compounds. The amount of radical polymerization initiator is generally from 50 ppm to 5% by weight, preferably from 0.01 to 0.5% by weight, based on the volume of the varnish.

While PBI is commercially available in the form of a DMA solution ("CELAZOLE™"), mere coating of the commercially available PBI solution cannot provide a PBI film having high film strength. For example, when films of PBI were formed by diluting a 30% (W/V) DMA solution of PBI with DMA to about 5% (W/V), applying the diluted solution on a glass and a bare electric wire (Cu), drying the coatings with a heating lamp for 3 hours, further drying the coatings at 130° C. for 4 hours, and then baking the dry coatings in an electric furnace at 350° C. for 80 minutes, the thus-obtained films had insufficient strength. Upon further baking at 450° C. for 60 minutes, the films decomposed. Analysis of the baked PBI films with a reflection-type FT-IR revealed that the absorption peak at a wavenumber of about 1,100 cm$^{-1}$ was weak which peak is assigned to C—N—C resulting from the crosslinking reaction of PBI, showing that although a film was formed, its strength was insufficient due to insufficient crosslinking. It has been found that the unsuccessful PBI film formation is due to the influence of a polymerization inhibitor incorporated in the dimethylacetamide (DMA) used as a solvent for PBI. Accordingly, the addition of a radical polymerization initiator was discovered to effectively form a PBI film having high film strength. It is believed that film formation for PBI is based on intermolecular crosslinking reaction at imidazole moieties upon heating or irradiation of electron beams, and the radical polymerization initiator such as azobisisobutyronitrile (AIBN) over comes the adverse effect of the polymerization inhibitor.

Specifically, a 30% DMA solution of PBI in which AIBN had been added was used to examine the film-forming properties thereof in detail. A 30% (W/V) DMA solution of PBI was diluted with DMA to give a solution having a PBI content of about 5% (W/V) and, at the same time, AIBN was added to the solution in an amount of 0.1% (W/V). The resulting solution was applied on a glass and the coatings were baked at 350° C. for 80 minutes. As a result, a film having sufficient strength was formed. This film was then baked at 450° C. for 60 minutes, but it did not decompose. The baked PBI film formed on the glass was analyzed with a reflection-type FT-IR. As a result, the absorption peak at a wavenumber of about 1,100 cm$^{-1}$ which is assigned to C—N—C resulting from the crosslinking reaction of PBI was observed clearly. The reasons for the formation of such a film with sufficient strength may be that the AIBN enabled the crosslinking reaction to proceed sufficiently under those conditions. Since a radical polymerization initiator such as AIBN also functions to eliminate the effect of the inhibitor contained in the DMA, elevating the baking temperature to a desired degree may be sufficient, that is, baking at around 450° C. may be adequate because the glass transition temperature $(T_g)$ is 427° C. It is believed that the radical polymerization initiator functions not only to eliminate the effect of the inhibitor but also to accelerate the crosslinking reaction.

The varnish of this invention may be applied on a conductor (electric wire) and baked or exposed to electron beams to produce an enameled wire. The varnish may also be applied on a covered electric wire comprising a conductor covered with an insulator such as (e.g., polyvinyl chloride and polyester), and baked or exposed to electron beams to produce a heat-resistant covered electric wire. This baking or irradiation treatment is generally conducted by repeating the procedure comprising coating with varnish, and baking or irradiating. The term "baking" means to heat the varnish coating to cure it. Curing may be effected byway of IR irradiation.

There are no particular limitations on the kind and diameter of conductors and on the kind and coated thickness of insulator in this invention. The conductors generally have a diameter of 30 μm to 2 mm. The thickness of varnish coatings is not limited either, and it is generally less than 100 μm.

The varnish-coated electric wire of this invention can be produced using an apparatus as illustrated in FIG. 1, which comprises a baking furnace 1, a coater 2, a continuous annealing furnace 3, and a bobbin 4. In this apparatus, a wire 5 which is a conductor, a covered electric wire, or the like and has been wound on the bobbin 4 is unwound from the bobbin 4. The unwound wire 5 is first annealed in the continuous annealing furnace 3 and then coated with varnish by the coater 2, and the varnish applied is baked in the baking furnace 1. The wire 5 covered with baked varnish is then repeatedly passed through the coater 2 and the baking furnace 1, thereby repeating varnish coating and baking as described above. The resulting coated wire 5 is withdrawn from a withdrawal part 6.

In the generally employed method for producing enameled wires, a horizontal furnace is used as the coating furnace in the case of thin wires of 0.6 mm or thinner in diameter, while a vertical furnace is used for wires thicker than those. The application and baking of PBI according to the present invention may be conducted likewise, using a horizontal or vertical furnace according to the intended use. Further, the number of coating times, the baking temperature, the coating speed, and other conditions may be suitably changed according to the kind of coating material to be baked and the type of baking furnace.

In the present invention, the number of coating times may generally be suitably selected from a range of from once to several hundred times. However, the preferred range thereof may be from twice to 20 times. The baking temperature may be suitably selected from a range of from room temperature to 1,000° C., but the preferred range thereof is from 300° C. to 800° C., and more preferably from 500° to 800° C.

As described above, PBI, which has excellent heat resistance, is soluble in basic solvents such as DMA, and highly heat-resistant enameled wires can be produced by directly applying a PBI-containing varnish to conductors. Further, a heat-resistant electric wire for ceramic electric wires can be produced by thickly coating a wire comprising an insulator-covered conductor with the varnish in the same manner as described above. Furthermore, by coating a flame-retardant polyethylene-coated (PE) wire with the varnish at a thickness as small as several micrometers in the same manner as described above, a heat-resistant PE wire which is usable as a substitute for a crosslinked polyvinyl chloride-coated (AVX) wire and has a higher heat resistance can be produced. Unlike the present-day AVX wires, the heat-resistant PE wire can be pulverized and regenerated (the PBI included therein serves as a heat stabilizer because it is a radical-absorbing agent) and is, hence, effective in solving the problem of poly(vinyl chloride) recycling.

Besides the enameled wires and PE wires described above, the present invention is also applicable to crosslinked polyethylene-covered electric wires for automotive use, insulated heat-resistant electric wires for high-voltage cables, insulated heat-resistant electric wires for communication cables, and the like.

Since the varnish of the present invention contains PBI having high heat-resistance, the varnish can be applied not only to electric wires but also to other devices required to have high heat-resistance such as heat-fixing rolls made of, for example, metal in copying machines.

The present invention will be explained below in more detail with reference to the following Examples, but the invention is not construed as being limited thereto. In the Examples, all parts are by weight.

EXAMPLE 1

To a mixture consisting of 30 parts of PBI and 70 parts of DMA was added AIBN in an amount of 0.1% (W/V). Thus, a varnish was prepared. The surface of a nickel-plated copper wire having an outer diameter of 0.5 mm was coated with the varnish by dipping the wire in the varnish and then baked at 600° C. and a line speed of 50 m/min. This procedure was repeated 8 times to obtain a PBI-coated, nickel-plated copper wire.

EXAMPLE 2

To a mixture consisting of 30 parts of PBI, 60 parts of DMA and 20 parts of DMSO was added AIBN in an amount of 0.1% (W/V). Thus, a varnish was prepared. The surface of a nickel-plated copper wire having an outer diameter of 0.5 mm was coated with the varnish by dipping the wire in the varnish and then baked at 600° C. and a line speed of 20 m/min. This procedure was repeated 8 times to obtain a PBI-coated, nickel-plated copper wire.

EXAMPLE 3

The surface of an oxygen-free copper wire having an outer diameter of 0.36 mm was coated with a varnish consisting of 20 parts of PBI and 80 parts of DMA by dipping the wire in the varnish and then baked at 500° C. and a line speed of 10 m/min. The above procedure was repeated 10 times to obtain a PBI-coated, oxygen-free copper wire.

EXAMPLE 4

APE wire for automotive use was prepared which was a polyethylene-coated conductor (oxygen-free copper wire) having a coating outer diameter of 2.5 mm and a conductor diameter of 0.36 mm. On the other hand, a varnish was prepared by adding AIBN to a mixture consisting of 20 parts of PBI and 80 parts of DMA in an amount of 0.1% (W/V). The surface of the PE wire for automotive use was coated with the varnish by dipping the wire in the varnish and then baked with an infrared lamp at 100° C. and a line speed of 15 m/min. This procedure was repeated 3 times to obtain a PBI-coated PE wire.

EXAMPLE 5

A wire for automotive use was prepared which was a crosslinked polyethylene-coated conductor (oxygen-free copper wire) having a coating outer diameter of 1.5 mm and a conductor diameter of 0.26 mm. On the other hand, a varnish was prepared by adding AIBN to a mixture consisting of 10 parts of PBI, 80 parts of DMA and 10 parts of DMSO in an amount of 0.1% (W/V). The surface of the wire for automotive use was coated with the varnish by dipping the wire in the varnish and then baked with an infrared lamp at 90° C. and a line speed of 50 m/min. This procedure was repeated 5 times to obtain a PBI-coated AEX wire.

EXAMPLE 6

The surface of a nickel-plated copper wire having an outer diameter of 1.5 mm was coated with a varnish consisting of 55 parts of PBI and 45 parts of DMA by dipping the wire in the varnish and then baked at 700° C. and a line speed of 60 m/min. The above procedure was repeated 20 times to obtain a PBI-coated, ceramic electric wire.

EXAMPLE 7

The surface of a nickel-plated copper wire having an outer diameter of 2.5 mm was coated with a varnish consisting of 65 parts of PBI and 35 parts of DMA by dipping the wire in the varnish and then baked at 600° C. and a line speed of 30 m/min. The above procedure was repeated 15 times to obtain a PBI-coated, ceramic electric wire.

EXAMPLE 8

The surface of a nickel-plated copper alloy wire having an outer diameter of 1.5 mm was coated with a varnish consisting of 55 parts of PBI and 45 parts of DMA by dipping the wire in the varnish and then baked at 500° C. and a line speed of 30 m/min. The above procedure was repeated 20 times to obtain a PBI-coated, ceramic electric wire.

EXAMPLE 9

The surface of an $Nb_3Sn$ alloy wire having an outer diameter of 1.5 mm was coated with a varnish consisting of 55 parts of PBI and 45 parts of DMA by dipping the wire in the varnish and then baked at 500° C. and a line speed of 30 m/min. The above procedure was repeated 20 times to obtain a PBI-coated electric wire.

EXAMPLE 10

The surface of a $V_3Ga$ alloy wire having an outer diameter of 1.5 mm was coated with a varnish consisting of 55 parts of PBI and 45 parts of DMA by dipping the wire in the varnish and then baked at 500° C. and a line speed of 30 m/min. The above procedure was repeated 20 times to obtain a PBI-coated electric wire.

EXAMPLE 11

The surface of an NbTi alloy wire having an outer diameter of 1.5 mm was coated with a varnish consisting of 55 parts of PBI and 45 parts of DMA by dipping the wire in the varnish and then baked at 500° C. and a line speed of 30 m/min. The above procedure was repeated 20 times to obtain a PBI-coated electric wire.

EXAMPLE 12

The surface of an $Nb_3Al$ alloy wire having an outer diameter of 1.5 mm was coated with a varnish consisting of 55 parts of PBI and 45 parts of DMA by dipping the wire in the varnish and then baked at 500° C. and a line speed of 30 m/min. The above procedure was repeated 20 times to obtain a PBI-coated electric wire.

EXAMPLE 13

The surface of an NiCr (20%) alloy wire having an outer diameter of 0.36 mm was coated with a varnish consisting of 20 parts of PBI and 80 parts of DMA by dipping the wire in the varnish and then baked at 500° C. and a line speed of 10 m/min. The above procedure was repeated 10 times to obtain a PBI-coated NiCr alloy wire.

EXAMPLE 14

The surface of a tungsten wire having an outer diameter of 0.36 mm was coated with a varnish consisting of 20 parts of PBI and 80 parts of DMA solvent by dipping the wire in the varnish and then baked at 500° C. and a line speed of 10 m/min. The above procedure was repeated 10 times to obtain a PBI-coated electric wire.

General properties of the samples obtained in the above Examples were evaluated, and are summarized in Tables 1 to 4.

TABLE 1

|  | Example 1 | Example 2 | Example 3 | Example 4 |
|---|---|---|---|---|
| Finished wire outer diameter (mm) | 0.516 | 0.511 | 0.401 | 2.502 |
| Coating thickness (mm) | 0.008 | 0.0055 | 0.0205 | 0.001 |
| Dielectric breakdown voltage (kV) (initial) | 2.1 | 2.2 | 3.5 | 1.5 |
| (after exposure) | 2.0[*1] | 2.1[*1] | 3.4[*1] | —[*4] |
| Thermal shock[*2] (3-fold diameter) | OK | OK | OK | —[*4] |
| Softening temperature (° C.) | 550 | 550 | 560 | 380 |
| Wear (times)[*3] | 40 | 40 | 50 | 35 |

(Note)
[*1] exposed at 250° C. for 168 h
[*2] elongation by 20%, followed by 220° C. × 0.5 h
[*3] load 4N (JASO D611)
[*4] not measured

TABLE 2

|  | Example 5 | Example 6 | Example 7 | Example 8 |
|---|---|---|---|---|
| Finished wire outer diameter (mm) | 1.503 | 1.518 | 2.520 | 1.519 |
| Coating thickness (mm) | 0.0015 | 0.009 | 0.010 | 0.008 |
| Dielectric breakdown voltage (kV) (initial) | 1.5 | 2.2 | 3.5 | 2.1 |
| (after exposure) | —[*4] | 2.0[*1] | 3.4[*1] | 2.1[*1] |
| Thermal shock[*2] (3-fold diameter) | —[*4] | OK | OK | OK |
| Softening temperature (° C.) | 370 | 550 | 560 | 550 |
| Wear (times)[*3] | 35 | 45 | 50 | 45 |

(Note) [*1],[*2],[*3], and [*4] : see Table 1

TABLE 3

|  | Example 9 | Example 10 | Example 11 | Example 12 |
|---|---|---|---|---|
| Finished wire outer diameter (mm) | 1.520 | 1.518 | 1.520 | 1.519 |
| Coating thickness (mm) | 0.010 | 0.009 | 0.010 | 0.008 |
| Dielectric breakdown voltage (kV) (initial) | 3.2 | 2.2 | 3.4 | 2.2 |
| (after exposure) | 3.3[*1] | 2.2[*1] | 3.3[*1] | 2.2[*1] |
| Thermal shock[*2] (3-fold diameter) | OK | OK | OK | OK |
| Softening temperature (° C.) | 550 | 550 | 550 | 550 |
| Wear (times)[*3] | 50 | 45 | 50 | 45 |

(Note) [*1],[*2], and [*3] : see Table 1

TABLE 4

|  | Example 13 | Example 14 |
|---|---|---|
| Finished wire outer diameter (mm) | 0.402 | 0.403 |

TABLE 4-continued

|  | Example 13 | Example 14 |
|---|---|---|
| Coating thickness (mm) | 0.0210 | 0.0215 |
| Dielectric breakdown voltage (kV) (initial) | 3.2 | 3.2 |
| (after exposure) | 3.3[*1] | 3.2[*1] |
| Thermal shock[*2] (3-fold diameter) | OK | OK |
| Softening temperature (° C.) | 550 | 550 |
| Wear (times)[*3] | 50 | 45 |

(Note) [*1],[*2], and [*3]: see Table 1

As apparent from Tables 1 to 4, the PBI-coated, heat-resistant electric wires according to the present invention possess all the properties required of an electric wire. In particular, the softening temperatures of all of the electric wires of the invention are higher then 350° C. showing that the electric wires have excellent heat resistance and can withstand temperatures of 350° C. or higher at all times. Furthermore, with respect to the wear test, the electric wires exhibited a high level of values ranging from 35 times to 50 times, showing that they have excellent abrasion resistance.

As described above, since the electric wire of the present invention has been coated with a varnish containing polybenzimidazole as a major resin component, the electric wire exhibits excellent heat resistance. In addition, the varnish of the present invention provides the effect that due to the polybenzimidazole's good low-temperature properties which enable the polymer to reliably perform its function even at a temperatures as low as −200 ° C., the varnish can be used to form an insulating covering on alloy wires having superconductivity, as described in Examples 9 to 12.

While the invention has been described in detail and with reference to specific embodiments thereof, it will be apparent to one skilled in the art that various changes and modifications can be made therein without departing from the spirit and scope thereof.

What is claimed is:

1. A heat resistant electric wire comprising a conductor or an insulator-covered conductor, and a cured and crosslinked varnish coating formed over said conductor or insulator-covered conductor, said cured varnish coating containing crosslinked polybenzimidazole in an amount of at least 50% by weight based on the weight of resin in said varnish cured in the presence of a radical polymerization initiator which is present in an amount of 50 ppm to 5% by weight based on the volume of the varnish used to form the cured varnish coating; wherein said crosslinked polybenzimidazole is the only polyimide in said cured varnish.

2. The electric wire as in claim 1, wherein said polybenzimidazole has a repeating unit represented by formula (I)

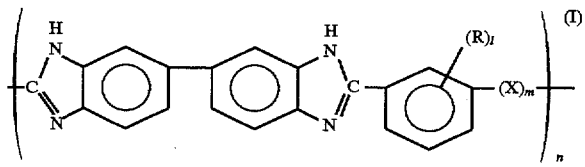

wherein X represents a sulfur atom or an oxygen atom; R represents an alkyl group, an alkoxy group, or an ester group; l is 0 or an integer of 1 to 4; m is 0 or 1; and n is an integer of 5 or more.

3. The electric wire as in claim 2, wherein said polybenzimidazole has a repeating unit of formula (I), wherein l and m are 0.

4. The electric wire as in claim 3, wherein said polybenzimidazole is a linear polymer.

5. The electric wire as in claim 1, wherein said radical polymerization initiator is selected from the group consisting of benzoyl peroxide, lauroyl peroxide, di-t-butyroperoxyphthalate, azobisisobutyronitrile, phenylazoallylsulfonic acid and N-nitroso-N-acyl compounds.

6. The electric wire as in claim 1, wherein said radical polymerization initiator crosslinks the polybenzimidazole at a temperature of less than 70° C.

7. The electric wire as in claim 1, wherein said radical polymerization initiator is present in an amount of 0.01% to 0.5% by weight based on the volume of the varnish.

8. The electric wire as in claim 1, wherein said varnish prior to curing comprises polybenzimidazole dissolved in a solvent consisting essentially of dimethylacetamide.

9. The electric wire according to claim 1, wherein said radical polymerization initiator is azobisisobutyronitrile.

10. A method of producing a heat resistant electric wire, which comprises coating a conductor or an insulator-covered conductor at a coating rate of 0.1 to 1,000 m/min with a varnish that contains a radical polymerization initiator and crosslinkable polybenzimidazole dissolved in a solvent, said polybenzimidazole being present in an amount of at least 50% by weight based on the weight of resin in said varnish and as the only polyimide in said varnish, said radical polymerization initiator being present in an amount of 50 ppm to 5% by weight based on the volume of the varnish, and curing the varnish to form a coating containing a crosslinked polybenzimidazole on said electric wire.

11. The method as in claim 10, wherein said polybenzimidazole has a repeating unit represented by formula (I)

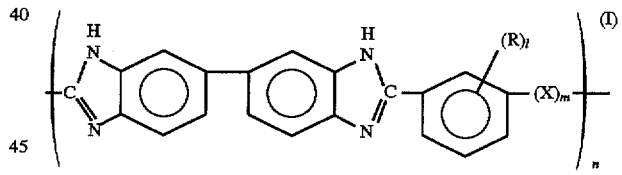

wherein X represents a sulfur atom or an oxygen atom; R represents an alkyl group, an alkoxy group, or an ester group; l is 0 or an integer of 1 to 4; m is 0 or 1; and n is an integer of 5 or more.

12. The method in claim 11, wherein said polybenzimidazole has a repeating unit of formula (I), wherein l and m are 0.

13. The method as in claim 10, wherein said radical polymerization initiator is selected from the group consisting of benzoyl peroxide, lauroyl peroxide, di-t-butyroperoxyphthalate, azobisisobutyronitrile, phenylazoallylsulfonic acid and N-nitroso-N-acyl compounds.

14. The method as in claim 10, wherein said radical polymerization initiator crosslinks the polybenzimidazole at a temperature of less than 70° C.

15. The method as in claim 10, wherein said radical polymerization initiator is present in an amount of 0.01% to 0.5% by weight based on the volume of the varnish.

16. The method as in claim 10, wherein said varnish further comprises a solvent selected from the group consisting of dimethylacetamide, dimethylformamide, pyridine and dimethylsulfoxide.

17. The method as in claim 10, wherein the concentration of said resin in said varnish is 5% to 40% by weight based on the volume of the varnish.

18. The method in claim 10, wherein said solvent consists essentially of dimethylacetamide.

19. The method in claim 10, wherein said radical polymerization initiator is azobisisobutyronitrile.

* * * * *